(12) United States Patent
Kikukawa

(10) Patent No.: US 11,386,527 B2
(45) Date of Patent: Jul. 12, 2022

(54) IMAGE PROCESSOR AND IMAGING PROCESSING METHOD

(71) Applicant: SONY CORPORATION, Tokyo (JP)

(72) Inventor: Tetsuya Kikukawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 24 days.

(21) Appl. No.: 16/963,689

(22) PCT Filed: Oct. 22, 2018

(86) PCT No.: PCT/JP2018/039217
§ 371 (c)(1),
(2) Date: Jul. 21, 2020

(87) PCT Pub. No.: WO2019/150668
PCT Pub. Date: Aug. 8, 2019

(65) Prior Publication Data
US 2021/0082088 A1    Mar. 18, 2021

(30) Foreign Application Priority Data

Jan. 30, 2018  (JP) .............................. JP2018-013617

(51) Int. Cl.
*G06T 5/00*        (2006.01)
*H04N 5/232*       (2006.01)
*G02B 27/01*       (2006.01)
(52) U.S. Cl.
CPC .......... *G06T 5/002* (2013.01); *H04N 5/23254* (2013.01); *H04N 5/23267* (2013.01); *G02B 27/0172* (2013.01); *G06T 2207/20024* (2013.01)

(58) Field of Classification Search
CPC .......... G06T 5/002; G06T 5/50; G06T 5/001; G06T 5/003; G06T 7/50; G06T 7/75;
(Continued)

(56) References Cited

U.S. PATENT DOCUMENTS 6,414,681 B1     7/2002  Ohshima et al.
6,584,219 B1 *   6/2003  Yamashita .............. G06T 15/10
                                                          382/154
(Continued)

FOREIGN PATENT DOCUMENTS

CN    102547322 A    7/2012
CN    102857686 A    1/2013
(Continued)

OTHER PUBLICATIONS

International Search Report and Written Opinion of PCT Application No. PCT/JP2018/039217, dated Jan. 15, 2019, 12 pages of ISRWO.

(Continued)

*Primary Examiner* — Jose L Couso
(74) *Attorney, Agent, or Firm* — Chip Law Group

(57) ABSTRACT

There are provided an image processor, an image processing method, and a program that acquire visible pixel information regarding a pixel viewed by a user in an image and perform blur processing on a basis of the visible pixel information and depth information indicating a depth value corresponding to each of pixels of the image during a predetermined period after the visible pixel information is acquired, thereby further enhancing a sense of immersion as if in a different space.

16 Claims, 11 Drawing Sheets

(58) Field of Classification Search
CPC .............. G06T 7/73; G06T 2207/20024; G06T 2207/10024; G06T 2207/10028; G06T 2207/20012; G06T 2207/30244; G06T 2207/10021; G06T 2207/20081; G06T 2207/20084; G06T 2207/10016; G06T 2207/20201; G06T 15/205; G06T 15/08; G06T 15/20; G06T 15/10; G06T 15/506; G06T 15/60; G06T 19/006; G06T 19/20; G06T 19/003; G06T 17/00; G06T 13/20; G06T 2200/04; G06T 2200/08; G06T 2213/08; H04N 5/23254; H04N 5/23267; H04N 5/225; H04N 5/2226; H04N 5/21; H04N 5/74; H04N 5/23251; H04N 5/23264; H04N 13/344; H04N 13/366; H04N 13/122; H04N 13/383; H04N 13/271; H04N 13/332; H04N 13/349; H04N 13/243; H04N 13/254; H04N 13/117; H04N 13/239; H04N 13/286; H04N 13/341; H04N 13/361; H04N 13/363; H04N 2013/0081; H04N 2013/0074; G02B 27/0172; G02B 27/01; G02B 27/0179; G02B 2027/0187; G02B 2027/0179; G02B 2027/014; G02B 2027/0134; G02B 2027/0118; G02B 2027/0123; G02B 2027/0125; G02B 17/08; G06F 3/011; G06F 3/012; G06F 3/04815; A63F 2300/8082; G06K 9/00664; G06K 9/00671; G06K 9/6234; G06K 9/6256; G06K 9/627; G06K 9/00201; G06K 9/4604; G06K 9/6267; G06K 9/0061; G06K 9/52; G06N 20/00; G06N 3/08–088; G06V 10/42; G06V 10/44; G06V 10/764; G06V 20/10; G06V 10/20; G06V 10/64; G06V 30/19147; G06V 40/193; G06V 40/197
See application file for complete search history.

(56) References Cited

U.S. PATENT DOCUMENTS

| | | | | |
|---|---|---|---|---|
| 2003/0160867 | A1* | 8/2003 | Ohto | H04N 7/18 348/135 |
| 2007/0262985 | A1* | 11/2007 | Watanabe | G06T 5/008 345/420 |
| 2009/0002365 | A1 | 1/2009 | Kurabayashi | |
| 2009/0022396 | A1* | 1/2009 | Watanabe | G06T 5/001 382/167 |
| 2016/0127710 | A1* | 5/2016 | Saban | G06T 11/00 386/241 |
| 2017/0019663 | A1* | 1/2017 | Hall | H04N 17/002 |
| 2017/0039686 | A1 | 2/2017 | Miura et al. | |
| 2018/0217260 | A1* | 8/2018 | Price | G06T 7/521 |
| 2018/0218509 | A1* | 8/2018 | Price | G02B 27/0172 |

FOREIGN PATENT DOCUMENTS

| | | |
|---|---|---|
| CN | 103002212 A | 3/2013 |
| CN | 103686124 A | 3/2014 |
| CN | 103843335 A | 6/2014 |
| CN | 104253939 A | 12/2014 |
| CN | 105026981 A | 11/2015 |
| CN | 105100772 A | 11/2015 |
| CN | 105516579 A | 4/2016 |
| CN | 106530241 A | 3/2017 |
| JP | 08-111877 A | 4/1996 |
| JP | 11-155154 A | 6/1999 |
| JP | 2012-178688 A | 9/2012 |
| JP | 2012-227685 A | 11/2012 |
| JP | 2016-025633 A | 2/2016 |
| JP | 2017-091190 A | 5/2017 |
| WO | 2016/202837 A1 | 12/2016 |
| WO | 2017/081915 A1 | 5/2017 |
| WO | 2019/150668 A1 | 8/2019 |

OTHER PUBLICATIONS

Office Action for CN Patent Application No. 201880087573.9, dated Aug. 31, 2021, 12 pages of English Translation and 09 pages of Office Action.

Office Action for CN Patent Application No. 201880087573.9, dated Jan. 19, 2022, 04 pages of English Translation and 03 pages of Office Action.

\* cited by examiner

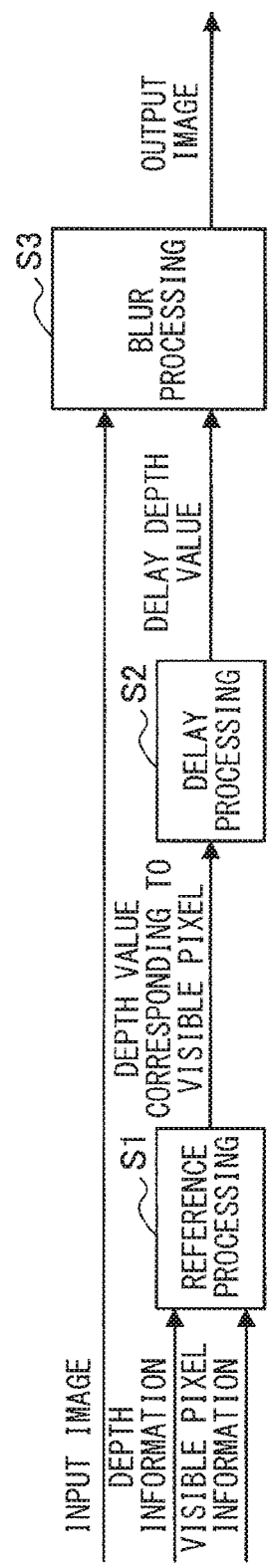
[FIG. 1]

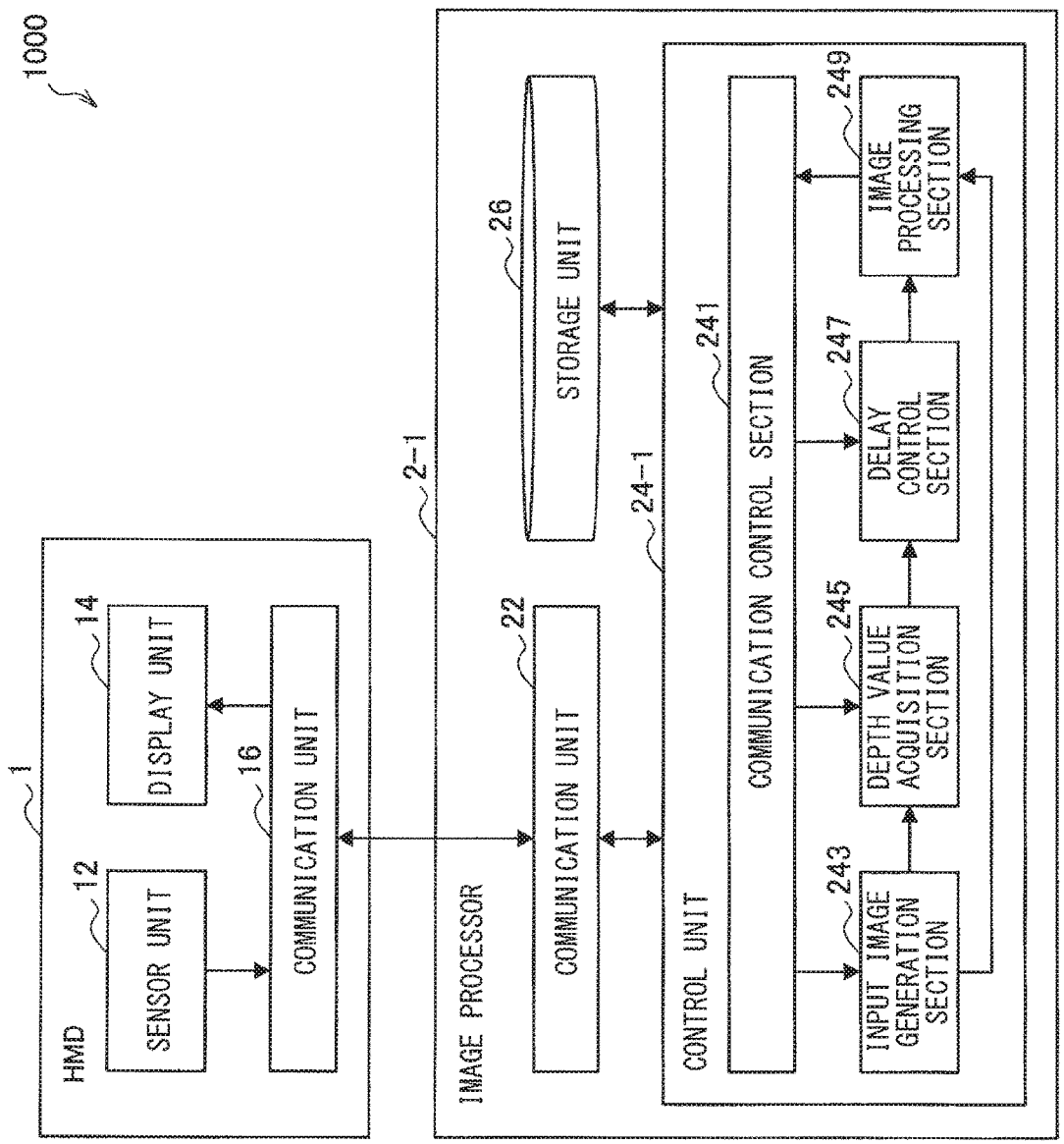
[FIG. 2]

[FIG. 3]
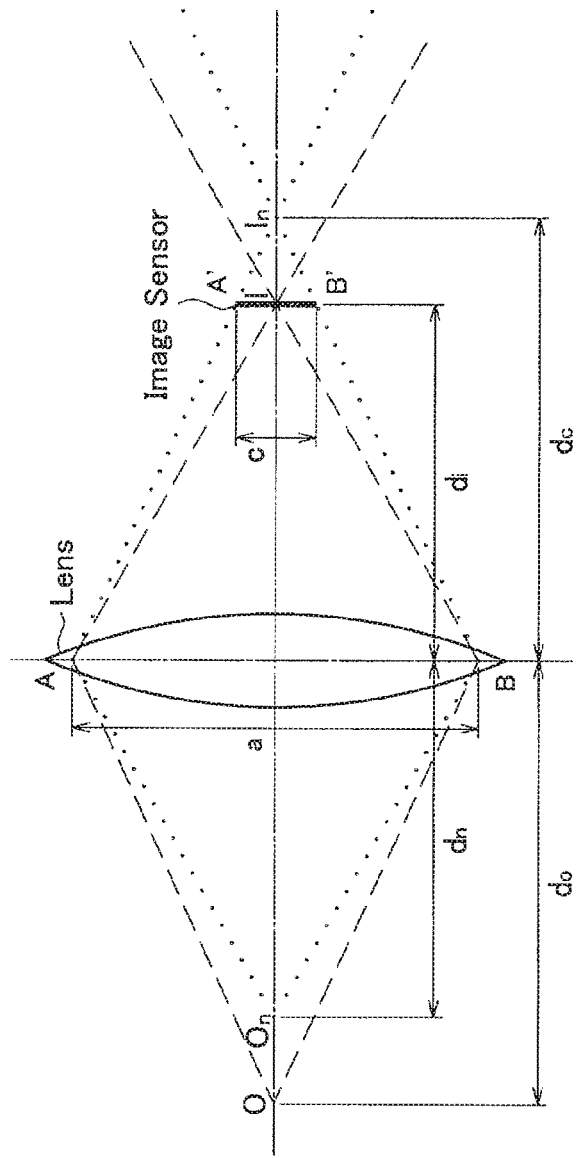
[FIG. 4]
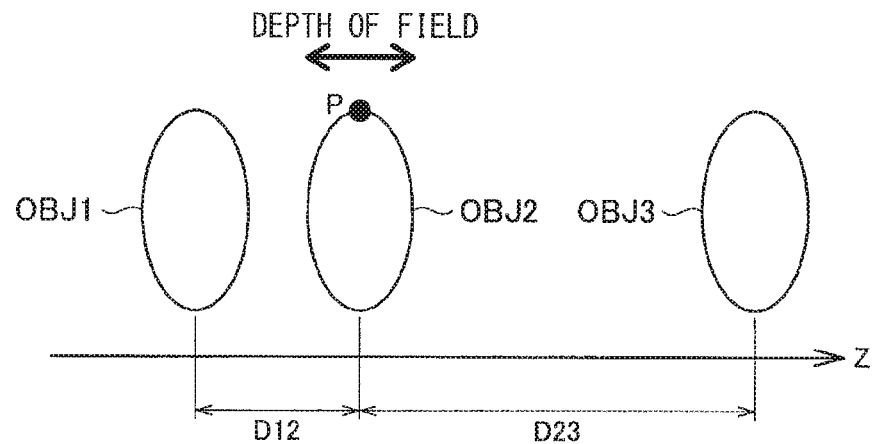

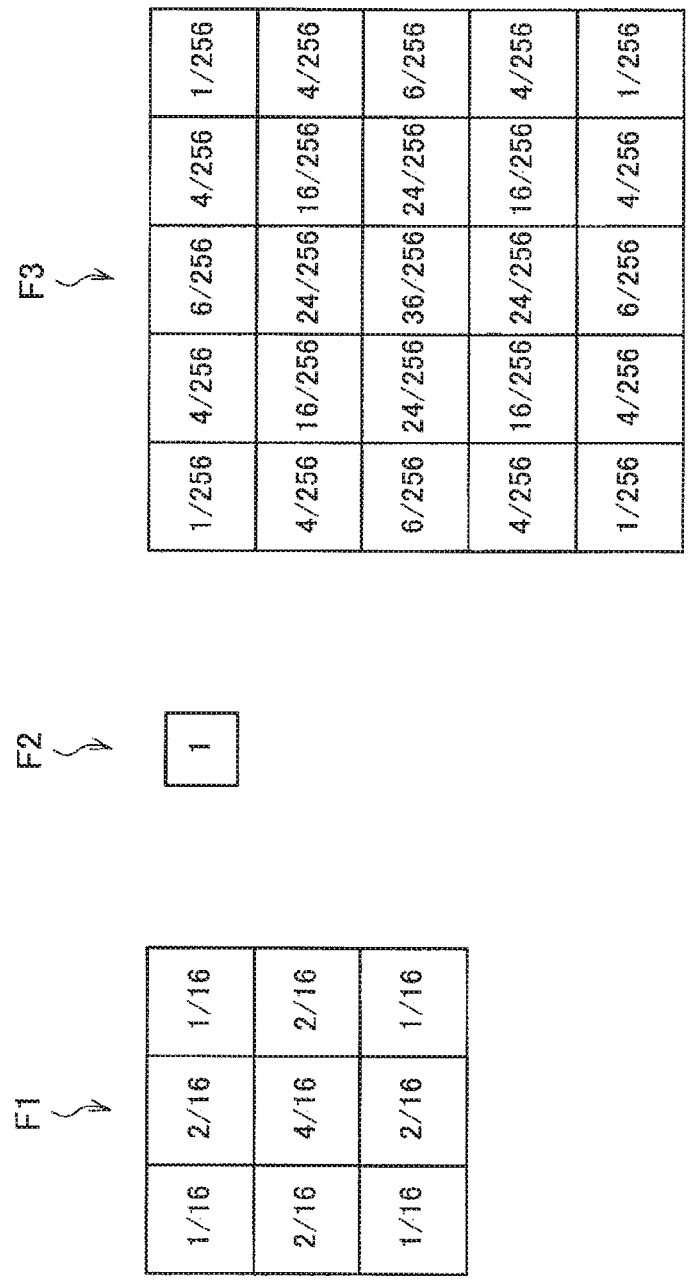
[FIG. 5]

[FIG. 6]
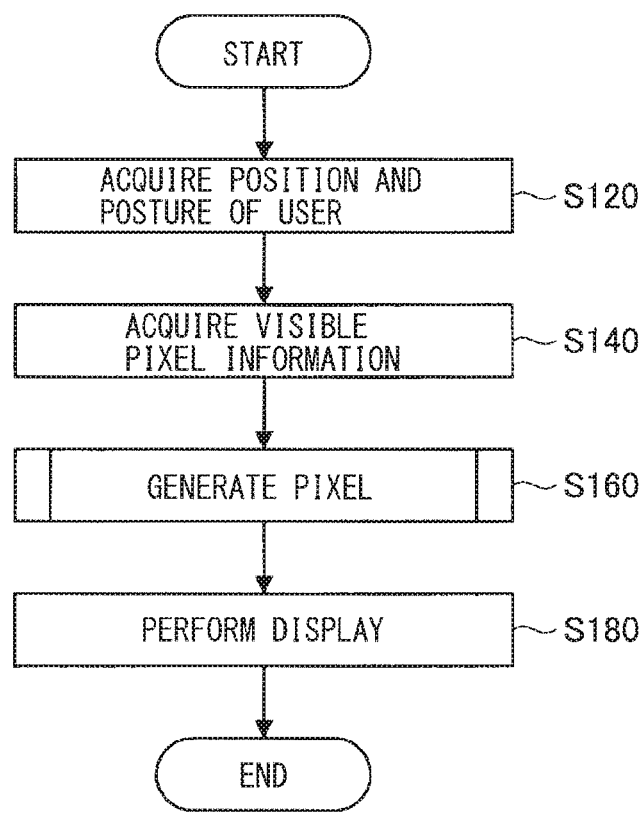

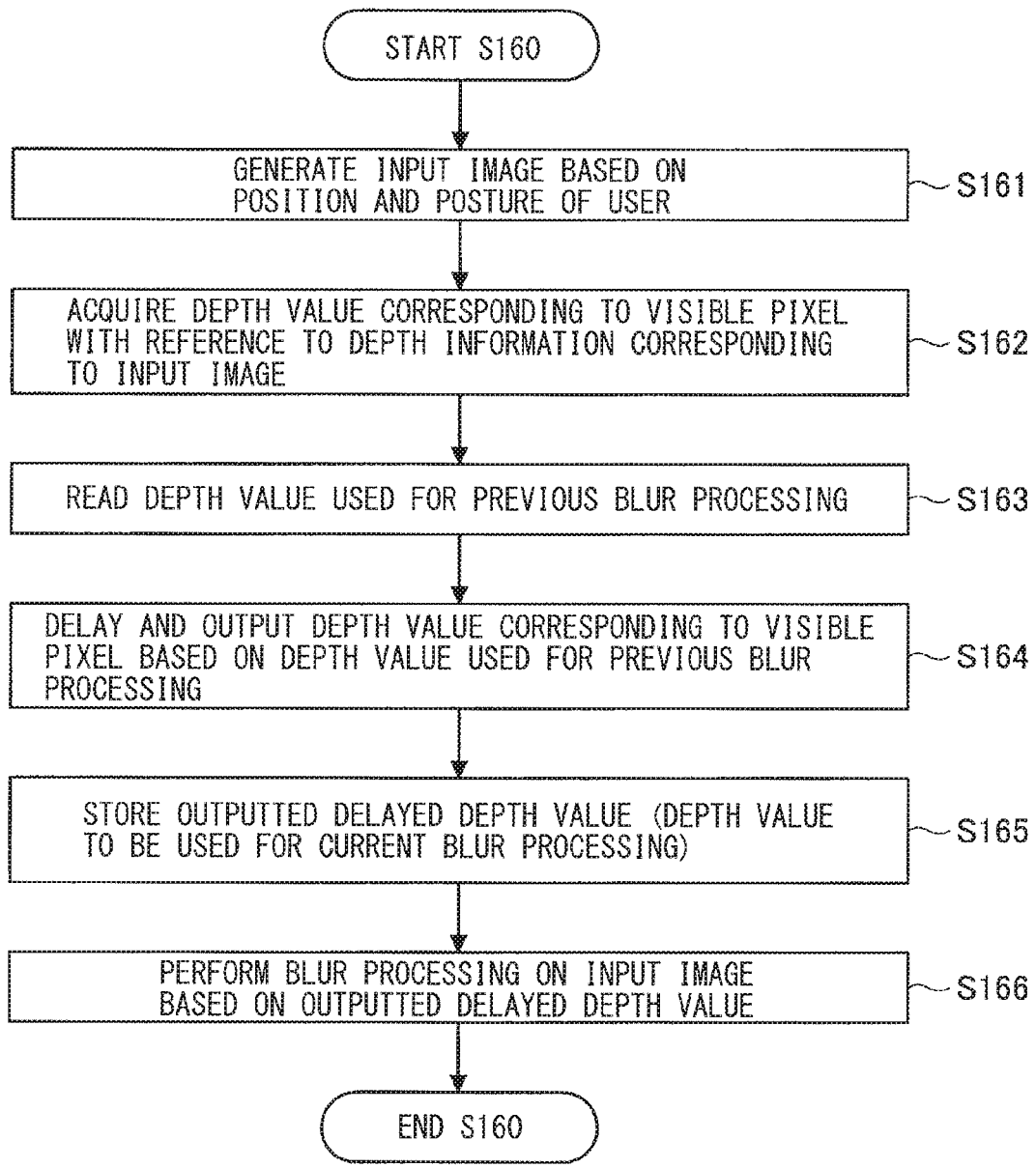
[FIG. 7]

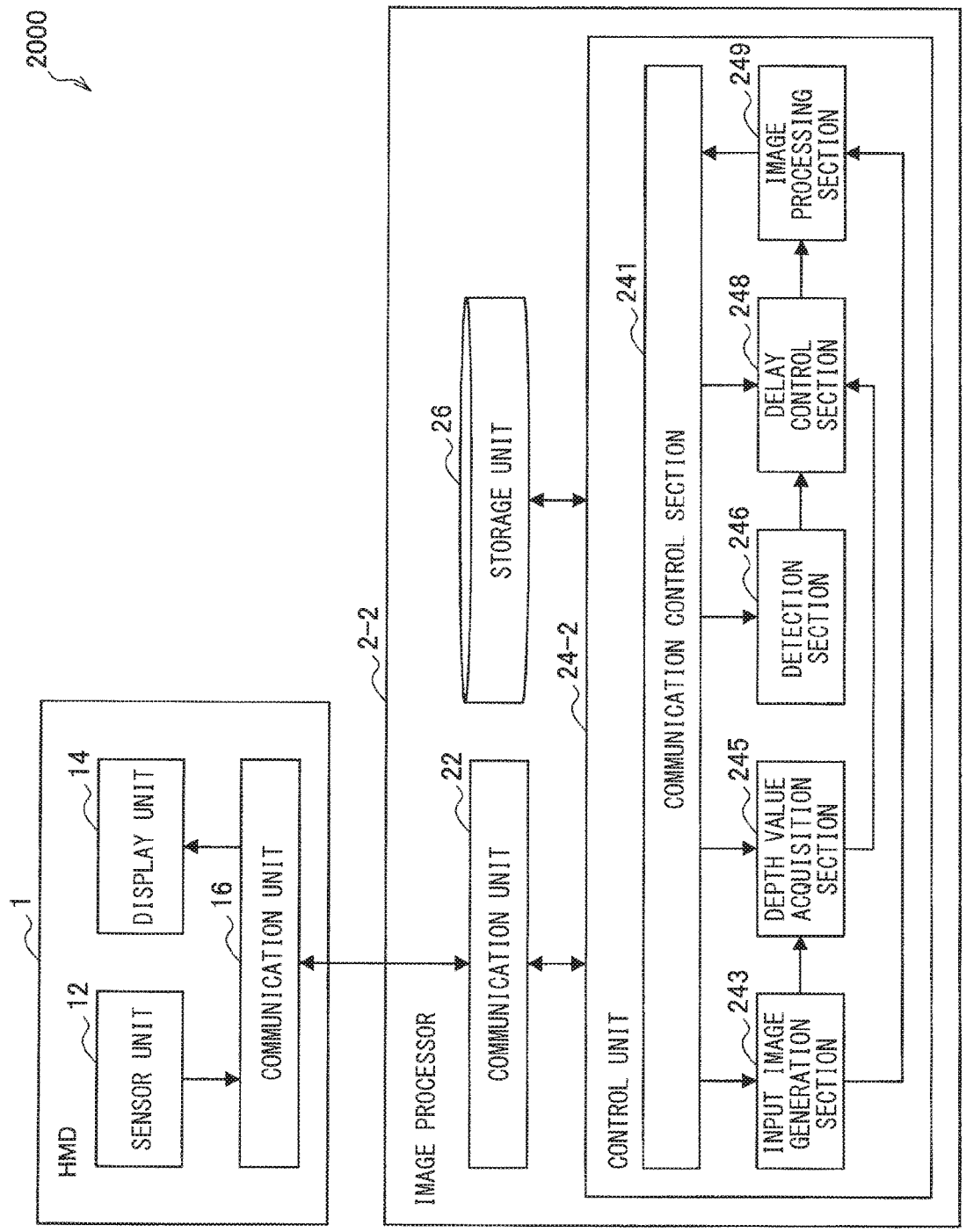
[FIG. 8]

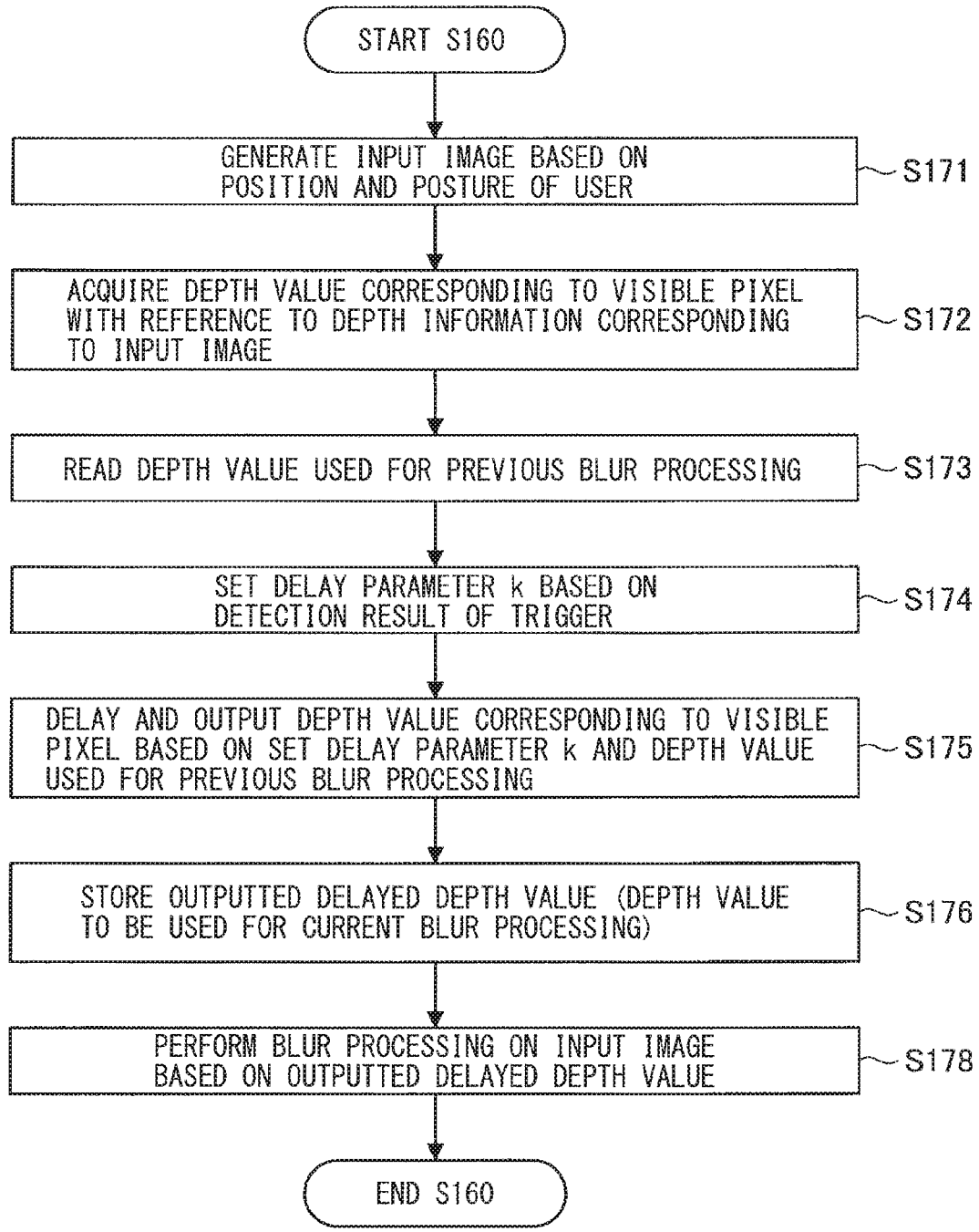

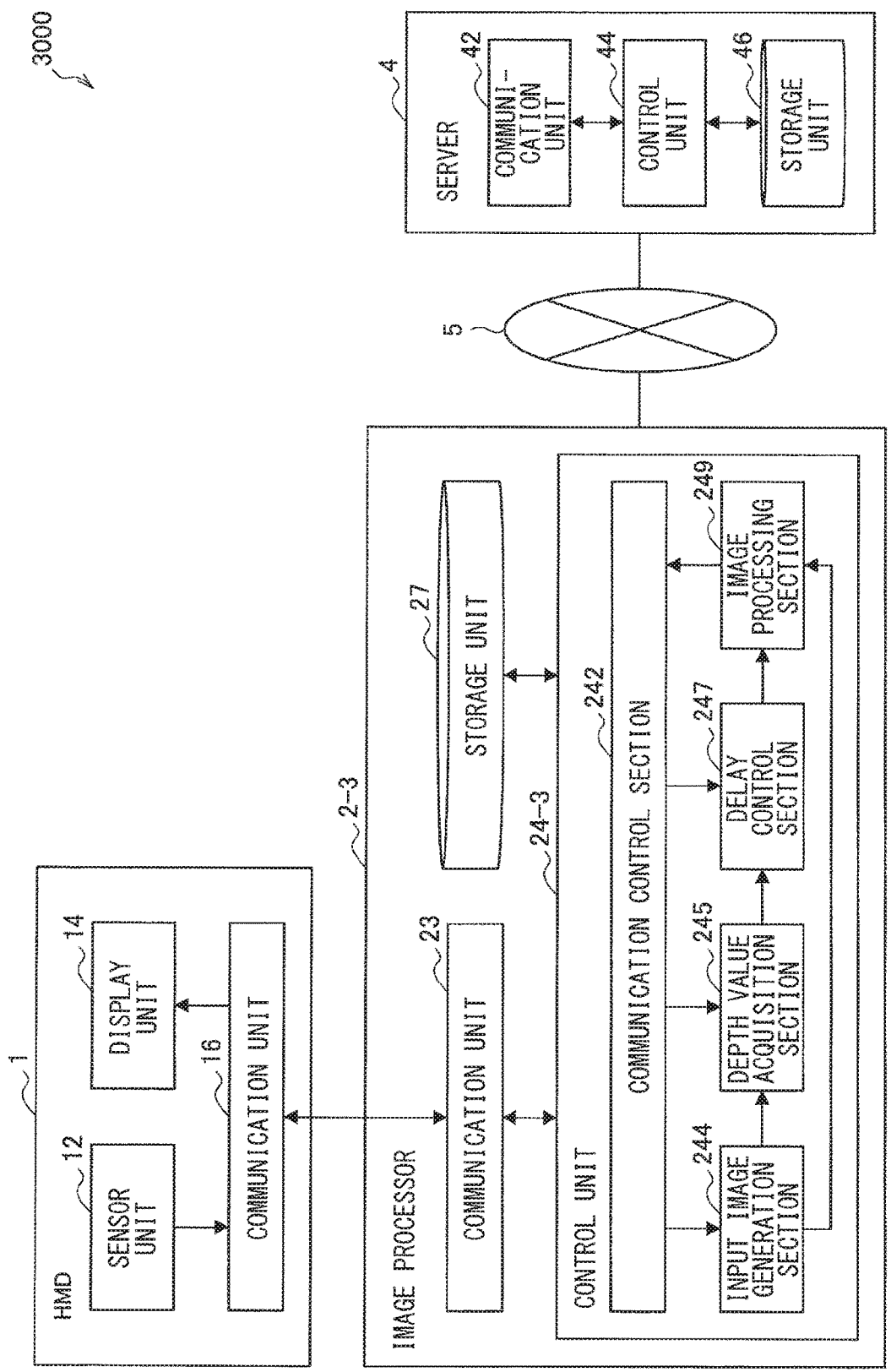
[FIG. 10]

[FIG. 11]
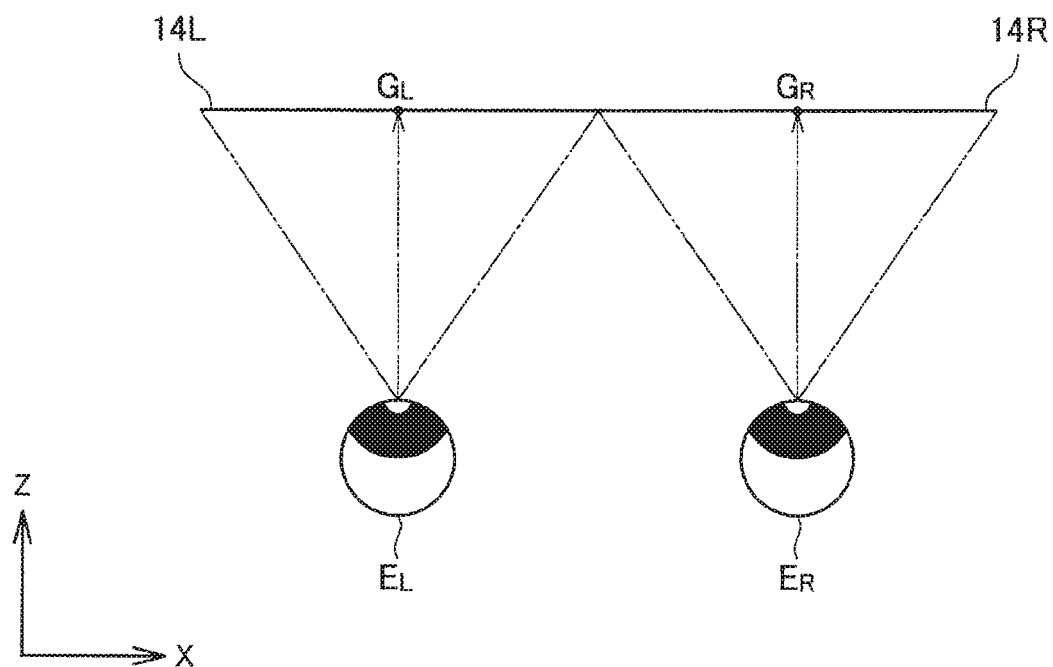

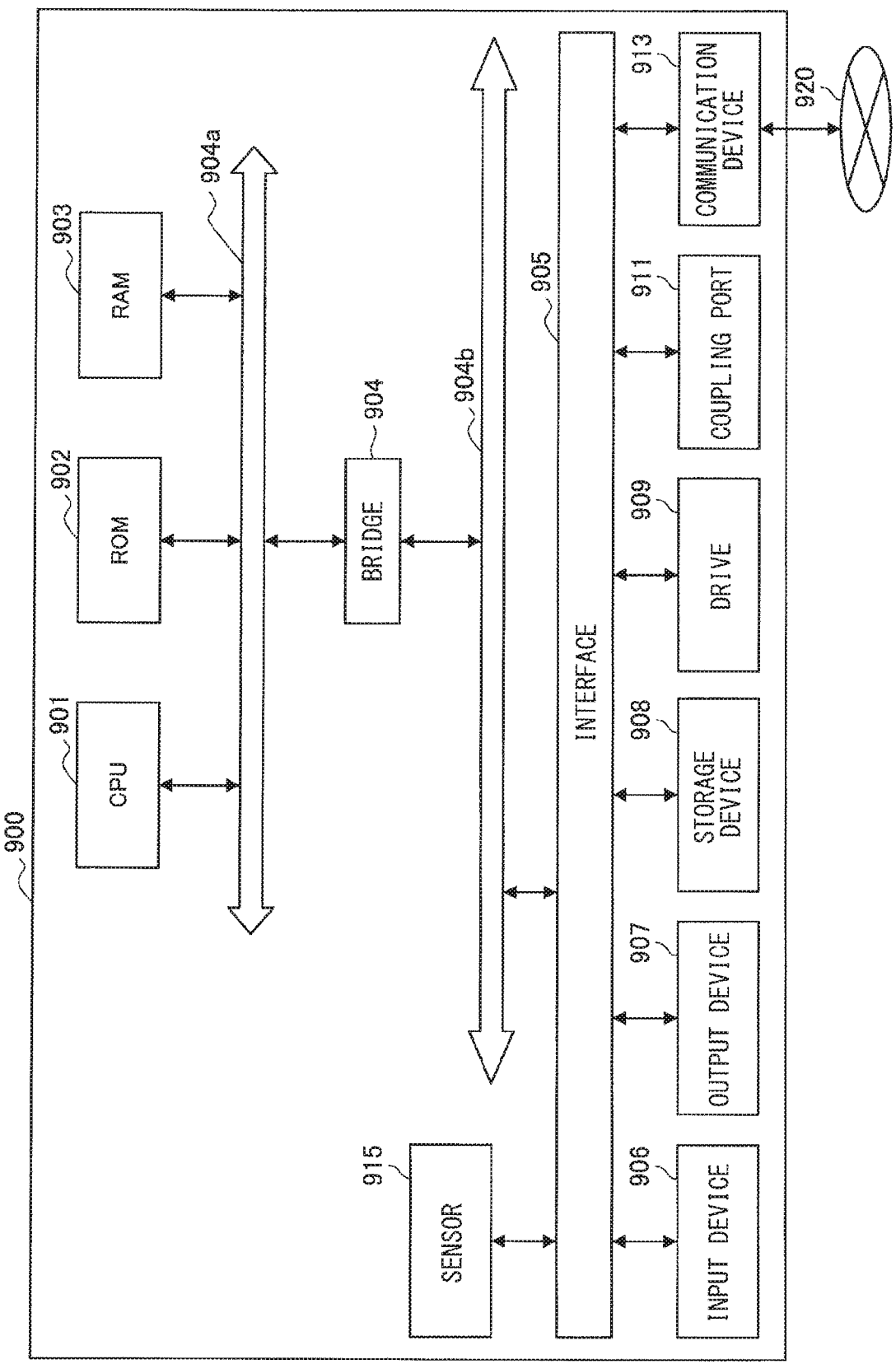
[FIG. 12]

IMAGE PROCESSOR AND IMAGING PROCESSING METHOD

CROSS REFERENCE TO RELATED APPLICATIONS

This application is a U.S. National Phase of International Patent Application No. PCT/JP2018/039217 filed on Oct. 22, 2018, which claims priority benefit of Japanese Patent Application No. JP 2018-013617 filed in the Japan Patent Office on Jan. 30, 2018. Each of the above-referenced applications is hereby incorporated herein by reference in its entirety.

TECHNICAL FIELD

The present disclosure relates to an image processor, an image processing method, and a program.

BACKGROUND ART

In recent years, various techniques have been proposed in which a head-tracking sensor is mounted on an HMD (Head Mounted Display) and images generated (rendered) from a viewpoint depending on a position of a head and a posture of a user are displayed on the HMD (e.g., PTL 1 listed below).

The technique that enables the user to view a content while freely changing the viewpoint in this manner is also called a free viewpoint image technique, which is able to give the user a sense of immersion as if in a different space.

CITATION LIST

Patent Literature

PTL 1: Japanese Unexamined Patent Application Publication No. 2016-025633

SUMMARY OF THE INVENTION

Problem to be Solved by the Invention

In the technique described above, it has been desired to further enhance a sense of immersion as if in a different space.

Means for Solving the Problem

According to the present disclosure, there is provided an image processor including: an acquisition section that acquires visible pixel information regarding a pixel viewed by a user in an image; and an image processing section that performs blur processing on the image on a basis of depth information indicating a depth value corresponding to each of pixels of the image, in which the image processing section performs the blur processing on a basis of the visible pixel information and the depth information during a predetermined period after the visible pixel information is acquired.

In addition, according to the present disclosure, there is provided an image processing method including: acquiring visible pixel information regarding a pixel viewed by a user in an image; and causing a processor to perform blur processing on the image on a basis of depth information indicating a depth value corresponding to each of pixels of the image, in which the blur processing is performed on the pixel viewed by the user in the image on a basis of the visible pixel information and the depth information during a predetermined period after the visible pixel information is acquired.

In addition, according to the present disclosure, there is provided a program that causes a computer to function as an image processor, in which the image processor includes an acquisition section that acquires visible pixel information regarding a pixel viewed by a user in an image, and an image processing section that performs blur processing on the image on a basis of depth information indicating a depth value corresponding to each of pixels of the image, in which the image processing section performs the blur processing on a basis of the visible pixel information and the depth information during a predetermined period after the visible pixel information is acquired.

Effect of the Invention

As described above, according to the present disclosure, it is possible to further enhance a sense of immersion as if in a different space.

It is to be noted that the above-mentioned effects are not necessarily limitative; in addition to or in place of the above effects, there may be achieved any of the effects described in the present specification or other effects that may be grasped from the present specification.

BRIEF DESCRIPTION OF THE DRAWINGS

FIG. 1 is an explanatory diagram illustrating an outline of processing according to a first embodiment of the present disclosure.

FIG. 2 is a block diagram illustrating an example of a configuration of a display system according to the same embodiment.

FIG. 3 is an explanatory diagram that describes a mechanism of blur processing occurring in imaging of a camera.

FIG. 4 is an explanatory diagram that describes intensity of blur processing performed by an image processing section 249.

FIG. 5 illustrates an example of blurring filters.

FIG. 6 is a flowchart diagram illustrating a flow of processing of a display system 1000 according to the present embodiment.

FIG. 7 is a flowchart diagram illustrating a detailed flow of processing of step S160.

FIG. 8 is a block diagram illustrating an example of a configuration of a display system according to a second embodiment of the present disclosure.

FIG. 9 is a flowchart diagram illustrating a detailed flow of processing of step S160 in the same embodiment.

FIG. 10 is a block diagram illustrating an example of a configuration of a display system 3000 according to Modification Example 1.

FIG. 11 is an explanatory diagram of an example in which a visible pixel is specified using information indicating a dominant eye.

FIG. 12 is an explanatory diagram illustrating a hardware configuration example.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

In addition, there is a case where, in the present specification and drawings, a plurality of components having substantially the same functional configurations may be distinguished by assigning different alphabets that follow the same reference numerals. However, in a case where it is unnecessary to particularly distinguish among the plurality of components having substantially the same functional configurations, only the same reference numerals are assigned.

It is to be noted that description is given in the following order.

<<1. First embodiment>>
   <1-1. Overview>
   <1-2. Configuration>
   <1-3. Operation>
   <1-4. Effects>
<<2. Second Embodiment>>
   <2-1. Configuration>
   <2-2. Operation>
   <2-3. Specific Examples>
   <2-4. Effects>
<<3. Modification Examples>>
   <3-1. Modification Example 1>
   <3-2. Modification Example 2>
   <3-3. Modification Example 3>
<<4. Hardware Configuration Example>>
<<5. Closing>>

1. First Embodiment

1-1. Overview

Before describing a display system according to a first embodiment of the present disclosure, description is given first of a background leading to creation of the display system according to the present embodiment.

For realistic expressions in games, movies, and the like, or for expressions that highlight a specific object, a portion of region is subjected to blur processing for displaying. Such image expression is considered to be effective also in a free viewpoint image technique.

In particular, in a case of displaying an image on an HMD worn on a head of a user and covering a field of view of the user, such image expression is considered to be effective in causing the user to feel as if reproducing a focusing mechanism in a human eye. In other words, a blurred region appears to be a region that is not focused by the user, and a non-blurred region appears to be a region that is focused by the user.

Therefore, for example, by acquiring information regarding a pixel viewed by the user in the image (hereinafter, referred to as a visible pixel), i.e., visible pixel information and by performing blur processing on the basis of the visible pixel information, effects are considered to be obtained, in which the user is caused to feel as if reproducing the focusing mechanism in the human eye to enhance a sense of immersion. According to the free viewpoint image technique, it is possible to acquire depth information (e.g., depth map) corresponding to a generated image. Therefore, it is considered, for example, that a depth value corresponding to the visible pixel is acquired by referring to the depth information using the visible pixel information, and the blur processing is performed to a region having a depth value with a large difference from the depth value corresponding to the visible pixel to thereby allow for the above-described effects.

Incidentally, the human eye has a feature in which it takes a certain amount of time to focus. Accordingly, when a movement of a line of sight of a user is reflected immediately in the blur processing based on the visible pixel information described above, the user may feel a sense of discomfort, leading to a possibility that the sense of immersion may deteriorate.

Therefore, the first embodiment of the present disclosure has been created, with the above-described circumstance as a point of observation. According to the present embodiment, a depth value corresponding to the visible pixel of the user is delayed, and the blur processing is performed on the basis of the delayed depth value (hereinafter, also called a delay depth value), thereby making it possible to further enhance the sense of immersion given to the user. Hereinafter, description is given of an outline of processing of the present embodiment having such effects.

FIG. 1 is an explanatory diagram illustrating an outline of processing according to the present embodiment. An input image illustrated in FIG. 1 is an image generated by a free viewpoint image technique depending on, for example, a position of a head and a posture of a user. In addition, depth information illustrated in FIG. 1 is information indicating a depth value corresponding to each of pixels of the input image, and may be, for example, a depth map. In addition, the visible pixel information illustrated in FIG. 1 may be, for example, information indicating a position of the visible pixel in the input image.

As illustrated in FIG. 1, first, processing of referring to the depth information based on the visible pixel information is performed (S1), and a depth value corresponding to the visible pixel is outputted. Subsequently, delay processing for delaying the depth value corresponding to the visible pixels is performed (S2), and a delay depth value is outputted. Then, the blur processing is performed on the input image on the basis of the delay depth value (S3), and an output image is outputted.

The description has been given above of the outline of the processing of the present embodiment. The output image outputted by the processing illustrated in FIG. 1 is displayed, for example, on an HMD worn on the head of the user, and the user feels as if reproducing a focusing mechanism in the human eye. Hereinafter, description is given sequentially of configuration examples and operation examples of a display system according to the present embodiment that achieves such processing and effects.

1-2. Configuration

FIG. 2 is a block diagram illustrating an example of a configuration of the display system according to the present embodiment. As illustrated in FIG. 2, a display system 1000 according to the present embodiment includes an HMD 1 and an image processor 2-1.

(HMD)

The HMD 1 is a display apparatus worn on the head of the user. The HMD 1 includes a sensor unit 12, a display unit 14, and a communication unit 16 as illustrated in FIG. 2.

The sensor unit 12 acquires, by sensing, information regarding the user and a surrounding environment. The sensor unit 12 includes, for example, an acceleration sensor, a gyro sensor, and the like for acquiring information indicating the position of the head and the posture of the user. In addition, the sensor unit 12 may include a line-of-sight sensor that is able to acquire visible pixel information regarding a visible pixel viewed by the user in an image displayed on the display unit 14.

The display unit 14 displays an output image received by the communication unit 16 from the image processor 2-1. The display unit 14 may be configured to be able to display separate images on the left eye and the right eye of the user. Such a configuration causes the display unit 14 to display, for example, a so-called stereoscopic image having binocular parallax, thereby enabling the user to carry out binocular stereopsis. It is to be noted that the display unit 14 may separately include a left eye display and a right eye display, or may display a left eye image on left side of one display and a right eye image on right side of the one display.

The communication unit 16 is a communication module for transmitting and receiving data to and from another apparatus by wire or wirelessly. The communication unit 16 performs wireless communication with an external apparatus directly or via a network access point, for example, in a method such as wired LAN (Local Area Network), wireless LAN, Wi-Fi (Wireless Fidelity, registered trademark), infrared communication, Bluetooth (registered trademark), or short-range/non-contact communication.

For example, the communication unit 16 transmits information indicating the position of the head and the posture of the user acquired by the sensor unit 12 and the visible pixel information of the user to the image processor 2-1, and receives an output image from the image processor 2-1.

(Image Processor)

The image processor 2-1 includes a communication unit 22, a control unit 24-1, and a storage unit 26, as illustrated in FIG. 2.

The communication unit 22 is a communication module for transmitting and receiving data to and from another apparatus by wire or wirelessly. The communication unit 22 performs wireless communication with an external apparatus directly or via a network access point, for example, in a method such as wired LAN (Local Area Network), wireless LAN, Wi-Fi (Wireless Fidelity, registered trademark), infrared communication, Bluetooth (registered trademark), or short-range/non-contact communication.

For example, the communication unit 22 functions as an acquisition unit, and receives (acquires), from the HMD 1, information indicating the position of the head and the posture of the user as well as the visible pixel information of the user. In addition, the communication unit 22 transmits, to the HMD 1, an output image outputted from the control unit 24-1 described later.

The control unit 24-1 functions as an arithmetic processing device and a control device, and controls overall operations inside the image processor 2-1 in accordance with various programs. In addition, the control unit 24-1 according to the present embodiment functions as a communication control section 241, an input image generation section 243, a depth value acquisition section 245, a delay control section 247, and an image processing section 249, as illustrated in FIG. 2.

The communication control section 241 controls communication made by the communication unit 22. For example, the communication control section 241 controls the communication unit 22 to transmit an output image outputted from the image processing section 249 to the HMD 1, thereby causing the HMD 1 to display the output image.

The input image generation section 243 generates an input image on the basis of information indicating the position of the head and the posture of the user received by the communication unit 22 from the HMD 1 and on the basis of content data stored in the storage unit 26, and provides the generated input image to the image processing section 249. The input image generated by the input image generation section 243 may be an image that have been generated (rendered) from a viewpoint depending on the position of the head and the posture of the user, as described above. In addition, the input image generation section 243 may generate a left eye input image and a right eye input image for stereoscopic display on the HMD 1. However, there is no particular difference between the left eye input image and the right eye input image in processing described below, and thus the processing described below as being performed on an input image can be applied, each independently, to the left eye input image and the right eye input image.

In addition, on the basis of the content data stored in the storage unit 26, the input image generation section 243 generates depth information corresponding to a generated input image (e.g., a depth map indicating depth of each of pixels of the input image), and provides the generated depth information to the depth value acquisition section 245 and the image processing section 249.

On the basis of the visible pixel information received by the communication unit 22 from the HMD 1 and the depth information provided from the input image generation section 243, the depth value acquisition section 245 acquires a depth value corresponding to the visible pixel of the user, and outputs the acquired depth value to the delay control section 247.

As described above, the depth information and the input image are associated with each other. In addition, the visible pixel information is information indicating a visible pixel in the display unit 14 of the HMD 1. The relationship of the association between the input image and the display unit 14 may be specified in advance. Therefore, for example, the depth value acquisition section 245 is able to specify a position of the visible pixel in the input image from the visible pixel information and refer to the depth information using the association between the depth information and the input image to acquire a depth values corresponding to the visible pixel.

The delay control section 247 delays the depth value corresponding to the visible pixel acquired by the depth value acquisition section 245, and outputs the delayed delay depth value to the image processing section 249. The delay processing performed by the delay control section 247 is expressed by, for example, the following Expression (1).

$$D_n = kD_{n-1} + (1-k)d_n \quad (1)$$

$d_n$: a depth value corresponding to a visible pixel at frame t=n $D_n$: a depth value to be used for blur processing at frame t=n (delay depth value)

$D_{n-1}$: a depth value used for blur processing at frame t=n−1 (past delay depth value)

k: delay parameter

The delay control section 247 outputs a delay depth value $D_n$ to the image processing section 249, and causes the storage unit 26 to store the delay depth value $D_n$. Then, when the delay processing is performed at the next frame, the delay control section 247 reads the previously outputted delay depth value from the storage unit 26, and uses the read delay depth value as the past delay depth value $D_{n-1}$ in the expression (1) to perform the delay processing.

In addition, in the expression (1), the delay parameter k is a parameter for adjusting a delay degree; the smaller delay parameter k is, the smaller the delay is. For example, when the delay parameter k=0 holds true, a depth value corresponding to the visible pixel is outputted immediately without delay. In addition, for example, when the delay parameter k=0.92 holds true, in a case where the visible pixel of the user does not move, the delay depth value $D_n$ reaches about 95% of the depth value corresponding to the visible pixel at 44 frames; for example, in a case of being displayed at 90 fps, time required therefor is about 0.5 seconds.

Providing a delay depth value to the image processing section 249 described later in this manner delays reflection of the visible pixel to blur processing performed by the image processing section 249. Then, the user feels as if reproducing a focusing mechanism in the human eye, thus achieving the effect of further enhancing the sense of immersion.

It is to be noted that, in the present embodiment, the delay parameter k may be preset, for example, and stored in the storage unit 26 described later.

On the basis of the delay depth value outputted from the delay control section 247 and the depth information provided from the input image generation section 243, the image processing section 249 performs the blur processing on the input image generated by the input image generation section 243 to generate an output image. The delay depth value to be used by the image processing section 249 in the blur processing described below is delayed and outputted by the delay control section 247 as described above. For this reason, during a predetermined period after visible pixel information is acquired (received) regarding a visible pixel viewed by the user in the image, the image processing section 249 performs the blur processing also on the visible pixel. As a result, a feature in which it takes a certain amount of time for the human eye to focus is reproduced, thus making it possible to further enhance the sense of immersion given to the user.

The blur processing to be performed by the image processing section 249 on an input image may be, for example, processing for reproducing blurring occurring in an image acquired by imaging of a camera. Therefore, description is given of the mechanism of blurring occurring in the imaging of the camera with reference to FIG. 3. FIG. 3 is an explanatory diagram that describes the mechanism of blurring occurring in the imaging of the camera.

FIG. 3 illustrates a state in which, an image of an object O, which is a subject, is formed at a position of a point 1, and an image of an object $O_n$ is formed at a position of a point $1_n$. A distance a between a point A and a point B illustrated in FIG. 3 is an aperture diameter (a diameter of a surface on which light is incident) of a lens. In addition, a distance c between a point A' and a point B' illustrated in FIG. 3 is a diameter of a circle of confusion which is blurring of an image produced by an object behind or in front of the object O (object $O_n$ in the example illustrated in FIG. 3). In addition, a distance $d_o$ illustrated in FIG. 3 is a distance between the lens and the object O. In addition, a distance $d_n$ illustrated in FIG. 3 is a distance between the lens and the object $O_n$ closer to the lens than the object O. In addition, $d_i$ illustrated in FIG. 3 is a distance between the lens and an image sensor. $d_c$ illustrated in FIG. 3 is a distance between the lens and the image of the object $O_n$.

Here, in FIG. 3, a triangle created by the point $1_n$, the point A', and the point B' and a triangle created by the point $1_n$, the point A, and the point B are similar to each other, and thus the following expressions (2) and (3) hold true.

$$a:c = d_c : d_c - d_i \quad (2)$$

$$C d_c = a(d_c - d_i) \quad (3)$$

Further, when a focal distance of the lens is defined as f, on the basis of lens formula, the following holds true.

$$d_c = \frac{d_n f}{d_n - f}, \ d_i = \frac{d_0 f}{d_0 - f}$$

Accordingly, the expression (3) can be modified as follows.

$$c = a \frac{\frac{d_n f}{d_n - f} - \frac{d_0 f}{d_0 - f}}{\frac{d_n f}{d_n - f}}$$

$$c = af \frac{d_0 - d_n}{d_n(d_0 - f)}$$

Further, an F value, which is an index indicating brightness of a lens, is a value obtained by dividing the focal distance f by the aperture diameter, and thus the following expression (4) is obtained.

$$c = \frac{f^2}{F} \frac{d_0 - d_n}{d_n(d_0 - f)} \quad (4)$$

It is appreciated, from the expression (4), that a magnitude of the distance c, which is a diameter of the circle of confusion, i.e., a magnitude of the blurring, is proportional to the square of the focal distance f and is inversely proportional to the F value, in a case where the distance $d_O$ between the lens and the object O is sufficiently larger than the focal distance f.

On the basis of the mechanism of blurring in the camera as described above, the image processing section 249 according to the present embodiment performs blur processing with intensity corresponding to a difference between the delay depth value outputted from the delay control section 247 and the depth value corresponding to each of pixels. For example, in a case where there is a large difference between the delay depth value and the depth value corresponding to a certain pixel, the image processing section 249 may perform the blur processing with strong intensity on the pixel as compared with a case where there is a small difference between the delay depth value and the depth value corresponding to the pixel. Such a configuration can reproduce effects similar to the blurring mechanism of the camera as described above with reference to FIG. 3.

FIG. 4 is an explanatory diagram that describes the intensity of the blur processing performed by the image processing section 249. FIG. 4 illustrates three objects OBJ1 to OBJ3. Assuming here that a point P on the object OBJ2 is a point corresponding to the delay depth value used for the blur processing, the image processing section 249 preferably performs blur processing on an input image as if the point P was in focus. For example, the image processing section 249 preferably performs, on the input image, such blur processing that the object OBJ2 is included in depth of field. In addition, a distance D23 in a direction of depth Z between the object OBJ2 and the object OBJ3 is larger than a distance D12 in the direction of the depth Z between the object OBJ 1 and the object OBJ2. Thus, it is desirable to perform the blur processing with stronger intensity on the pixel of the object OBJ3 than on the pixel of the object OBJ1.

For example, the image processing section 249 may apply a blurring filter such as Gaussian filter to each of pixels to perform the blur processing. In addition, in such a case, the image processing section 249 is able to control the intensity of the blur processing by a tap length (filter size) of the blurring filter.

For example, the image processing section 249 may set the tap length of the blurring filter applied to each of the pixels in accordance with the difference between the delay depth value and the depth value corresponding to each of the pixels; the larger the difference between the delay depth value and the depth value corresponding to each of the pixels is, the larger the tap length may be set.

FIG. 5 illustrates an example of blurring filters. A blurring filter F1 illustrated in FIG. 5 is a Gaussian filter with a tap length being set to 3×3, and is applied to pixels of the object OBJ1 illustrated in FIG. 4. In addition, a blurring filter F2 illustrated in FIG. 5 is a Gaussian filter with a tap length being set to 1×1, and is applied to pixels of the object OBJ2 illustrated in FIG. 4. In addition, a blurring filter F3 illustrated in FIG. 5 is a Gaussian with a filter tap length being set to 5×5, and is applied to pixels of the object OBJ3 illustrated in FIG. 4.

Applying the blurring filters F1 to F3 with different tap lengths in this manner causes an output image to be outputted to allow the pixels of the object OBJ2 to appear clear. In addition, in the output image, the object OBJ1 slightly distant from the object OBJ2 appears more blurred than the object OBJ2, and the object OBJ3 more distant from the object OBJ2 appears still more blurred than the object OBJ1. As a result, the user feels as if reproducing the focusing mechanism in the human eye, thus achieving the effect of further enhancing the sense of immersion.

It is to be noted that the blur processing performed by the image processing section 249 is not limited to such examples. For example, the image processing section 249 may perform the blur processing using a blurring filter other than the Gaussian filter. In addition, the image processing section 249 may perform well-known image processing other than the blur processing.

Returning to FIG. 2, the description is continued for the configuration of the image processor 2-1. The storage unit 26 stores programs for causing the respective configurations of the image processor 2-1 to function and parameters. In addition, the storage unit 26 may store content data for the input image generation section 243 to generate an input image and depth information corresponding to the input image The content data stored in the storage unit 26 may be, for example, a combination of images and the depth information, or a combination of mesh polygon data and textures.

1-3. Operation

The description has been given above of the configuration example of the display system 1000 according to the present embodiment. Consequently, description is given of an operation example of the display system 1000 according to the present embodiment with reference to FIGS. 6 and 7.

FIG. 6 is a flowchart diagram illustrating a flow of processing of the display system 1000 according to the present embodiment. As illustrated in FIG. 6, first, the sensor unit 12 of the HMD 1 acquires, by sensing, a position of the head and a posture of a user (S120). Subsequently, the sensor unit 12 of the HMD 1 acquires, by sensing, a visible pixel of the user (S140). It is to be noted that information on the position of the head and the posture of the user acquired in step S120 and visible pixel information regarding the visible pixel of the user acquired in the step S140 are transmitted from the HMD 1 to the image processor 2-1 as occasion demands.

The image processor 2-1 generates an output image on the basis of information received from the HMD 1 (S160). Details of processing of step S160 are described later with reference to FIG. 7. Subsequently, the output image generated in step S160 is transmitted from the image processor 2-1 to the HMD 1, and is displayed on the display unit 14 of the HMD 1 (S180).

FIG. 7 is a flowchart diagram illustrating a detailed flow of the processing of step S160 illustrated in FIG. 6. As illustrated in FIG. 7, first, the input image generation section 243 generates an input image and depth information corresponding to the input image on the basis of information indicating the position of the head and the posture of the user acquired in step S120 and on the basis of the content data stored in the storage unit 26 (S161).

Subsequently, the depth value acquisition section 245 refers to the depth information corresponding to the input image generated in step S161 to acquire a depth value corresponding to the visible pixel acquired in step S140 (S161).

Subsequently, the delay control section 247 reads a depth value used in previous blur processing from the storage unit 26 (S163). Further, on the basis of the depth value used in the previous blur processing read in step S163, the delay control section 247 delays the depth value corresponding to the visible pixel to output a delay depth value (S164).

The delay depth value outputted in step S164 is stored in the storage unit 26 as a depth value to be used in the current blur processing (S165). Then, the image processing section 249 performs blur processing on the input image on the basis of the delay depth value outputted in step S164 to generate an output image (S166).

1-4. Effects

As described above, according to the first embodiment of the present disclosure, reflection of the movement of the line of sight of the user is delayed, and the blur processing is performed on the basis of the visible pixel information, thereby further enhancing the sense of immersion while suppressing the sense of discomfort given to the user.

2. Second Embodiment

The description has been given above of the first embodiment of the present disclosure. Subsequently, description is given of a second embodiment of the present disclosure. In the foregoing first embodiment, the delay parameter k for adjusting the delay degree is preset. In contrast, according to the second embodiment of the present disclosure, a trigger is detected on the basis of a predetermined condition, and, on the basis of a detection result of the trigger, the delay parameter k is changed to thereby control the delay degree of the depth value. Such a configuration makes it possible to provide the user with more comfortable viewing or to further reduce the sense of discomfort given to the user.

Hereinafter, description is given of a configuration example of the second embodiment that achieves the above-described effects. It is to be noted that, in the following description, differences from the first embodiment are mainly described, and descriptions of configurations and operations that are common to those of the first embodiment are omitted as appropriate.

2-1. Configuration

FIG. 8 is a block diagram illustrating an example of a configuration of a display system according to the present embodiment. As illustrated in FIG. 8, a display system 2000 according to the present embodiment includes the HMD 1 and an image processor 2-2. It is to be noted that, among the configurations illustrated in FIG. 8, substantially the same configurations as the configurations described with reference to FIG. 2 are denoted by the same reference numerals.

As illustrated in FIG. 8, the image processor 2-2 includes the communication unit 22, a control unit 24-2, and the storage unit 26. The configurations of the communication unit 22 and the storage unit 26 illustrated in FIG. 8 are substantially the same as the configurations of the communication unit 22 and the storage unit 26 described with reference to FIG. 2, and thus descriptions thereof are omitted here.

Similarly to the control unit 24-1 described with reference to FIG. 2, the control unit 24-2 functions as an arithmetic processing device and a control device, and controls overall operations inside the image processor 2-2 in accordance with various programs. However, the control unit 24-2 according to the present embodiment differs from the control unit 24-1 described with reference to FIG. 2 in that the control unit 24-2 also functions as a detection section 246 as illustrated in FIG. 8 and in that a function of a delay control section 248 differs partially from the function of the delay control section 247.

The detection section 246 detects a trigger on the basis of a predetermined condition. The predetermined condition is a condition related to a control of a delay degree of a depth value performed by the delay control section 248 described later. For example, in a case where no trigger is detected, the delay parameter k may be set to a predetermined reference value. Then, the detection section 246 detects a trigger for which the delay parameter k is desirably set to a value smaller than the reference value or a value larger than the reference value.

For example, the detection section 246 may detect a trigger related to a state of the user. Although the state of the user to be detected may vary widely, for example, the detection section 246 may detect a trigger related to a speed of a movement of the user, or may detect a trigger related to a predetermined motion. It is to be noted here that the movement of the user may include not only the movement of the head of the user, but also the movement of a line of sight of the user.

In addition, the detection section 246 may detect a trigger related to an object included in an input image. For example, the detection section 246 may detect a trigger related to a distance from the user to the object. Alternatively, the detection may be performed for a trigger related to whether or not object is to be emphasized. It is to be noted that the distance from user to the object is specified from depth information corresponding to the input image. In addition, the object used to detect a trigger may be every object included in the input image, or may be an object viewed by the user or being present in the vicinity of the visible pixel of the user, among objects included in the input image.

In addition, the detection section 246 may detect a trigger related to a content type of the input image. The content type may include, for example, a genre of a content. Alternatively, the content type may include a type of whether or not an object of attention is clear. Alternatively, the content type may include a type of whether or not the content includes an object with a movement.

It is to be noted that, in order to detect the triggers as described above, the detection section 246 may use the information regarding the position of the head and the posture of the user received from the HMD 1, the visible pixel information, information regarding the content stored in the storage unit 26, and other types of information. In addition, the detection of a trigger performed by the detection section 246 may vary widely, and is not limited to the examples described above.

Similarly to the delay control section 247 described with reference to FIG. 2, the delay control section 248 delays the depth value corresponding to the visible pixel acquired by the depth value acquisition section 245, and outputs the delayed delay depth value to the image processing section 249. However, the delay control section 248 according to the present embodiment differs from the delay control section 247 in that the delay degree of the depth value is controlled on the basis of the detection result of the trigger performed by the detection section 246 described above.

In a case where no trigger is detected by the detection section 246, the delay control section 248 according to the present embodiment sets the delay parameter k to a predetermined reference value, and performs the delay processing in accordance with the above-described expression (1). The reference value is desirably a value at which focusing is performed at such a speed at which a person normally views an object, and the reference value may be 0.92 in a case of being displayed at 90 fps, for example, although the value depends on the frame rate, or the like of the HMD 1.

In addition, in a case where a trigger is detected by the detection section 246, the delay control section 248 sets the delay parameter k to a value smaller than the reference value (a value close to 0) or a value larger than the reference value (a value close to 1), depending on the type of the detected trigger. It is to be noted that, setting the value of the delay parameter to a value smaller than the reference value decreases the delay, and setting the value of the delay parameter to a value larger than the reference value increases the delay.

For example, in a case where the detection section 246 detects, as a trigger, that the movement of the user is faster than a predetermined threshold value, or in a case where the detection section 246 detects, as a trigger, a predetermined motion, such as the user walking around or the user shaking his or her head, it is highly possible that the position of the visible pixel changes at a high speed. Therefore, in a case where such a trigger is detected, the delay control section 248 may set the value of the delay parameter k to a value smaller than the reference value to be able to follow the movement of the visible pixel.

In addition, in a case where the detection section 246 detects, as a trigger, that an object included in the input image is distant from the user, it is highly possible that a change in the depth value corresponding to the visible pixel is small. Therefore, in a case where such a trigger is detected, the delay control section 248 may set the value of the delay parameter k to a value smaller than the reference value to allow the user to feel smooth focusing.

In addition, the detection section 246 detects, as a trigger, that the user views an object to be highlighted, it is desirable to highlight the object to allow the user to pay attention to the object, even when the visible pixel leaves the object thereafter. Therefore, in a case where such a trigger is detected, the delay control section 248 may set the value of the delay parameter k to a value larger than the reference value to allow the user to pay attention to the object to be highlighted.

2-2. Operation

The description has been given above of the configuration example of the display system 2000 according to the present embodiment. Subsequently, description is given of an operation example of the display system 2000 according to the present embodiment. However, the flow of processing of the display system 2000 according to the present embodiment is similar to the flow of the processing of the display system 1000 described with reference to FIG. 6, except that the processing of step S160 illustrated in FIG. 6 is partially different. Therefore, a detailed flow of the processing of step S160 in the present embodiment is described with reference to FIG. 9.

FIG. 9 is a flowchart diagram illustrating a detailed flow of the processing of step S160 in the present embodiment. Processing of each of steps S171 to S173 illustrated in FIG. 9 is similar to the processing of each of steps S161 to S163 described with reference to FIG. 7, and thus descriptions thereof are omitted here.

In the following step S174, the detection section 246 detects a trigger, and the delay control section 248 sets the delay parameter k on the basis of the detection result of the trigger. Further, in accordance with the delay parameter k set in step S174, and on the basis of the depth value used in the previous blur processing read in step S173, the delay control section 248 delays the depth value corresponding to the visible pixel, and outputs the delay depth value (S175).

Processing of each of subsequent steps S176 to S177 illustrated in FIG. 9 is similar to the processing of each of steps S165 to S166 described with reference to FIG. 7, and thus description thereof is omitted here.

2-3. Specific Examples

The description has been given above of the configuration example and the operation example of the present embodiment. Hereinafter, description is given of some specific application examples of the present embodiment.

Specific Example 1

Description is given, as a specific example 1, of a case of viewing a content in which a target of attention is clear.

For example, in a case of viewing a content in which a singer is alone on a stage in a music live show, display is performed basically on the basis of a delayed delay depth value, with a reference value being set as the delay parameter k. However, in a case where the detection section 246 detects a high point of the music as a trigger, the delay parameter k larger than the reference value is set to allow the delay to increase when the visible pixel moves to an object other than the singer. Such a configuration makes it possible to present to the user the singer to be paid attention to.

In addition, also in a case of watching a sports content such as soccer, for example, display is performed basically on the basis of a delayed delay depth value, with a reference value being set as the delay parameter k. However, in a case where the detection section 246 detects an exciting scene such as a goal scene as a trigger, the delay parameter k larger than the reference value is set to allow the delay to increase when movement is made to an unimportant position. Such a configuration makes it possible to present the user an important scene to be paid attention to. Alternatively, in a case where the detection section 246 detects, as a trigger, a motion of the user shaking his or her head, the delay parameter k smaller than the reference value is set. Such a configuration allows the user to have a clear view, thus making it easier for the user to view the entire image.

Specific Example 2

Description is given, as a specific example 2, of a case in which the user is able to freely move around to view a content while changing viewpoints.

For example, in a case where the user is taking an extensive view without moving much, display is performed on the basis of a delayed delay depth value, with a reference value being set as the delay parameter k in order to achieve a more realistic expression. For example, this is more effective in a case of stereoscopically viewing a moving image in which nature is shot.

Meanwhile, in a case where the detection section 246 detects, as a trigger, that the user is moving around at a high speed in an FPS (First Person Shooting) game or the like, the delay parameter k smaller than the reference value is set in order to quickly judge the situation from visual information.

In addition, in a case where the user views the image while moving, a predetermined period during which the blur processing is performed on the visible pixel may be decreased as compared with a case where the user views the image while stopping. Such a configuration enables the user to view the image clearly even in a case where the user is moving. However, such an example is not limitative; in the case where the user views the image while moving, the predetermined period during which the blur processing is performed on the visible pixel may be increased as compared with the case where the user views the image while stopping.

2-4. Effects

As described above, according to the second embodiment of the present disclosure, a trigger is detected on the basis of a predetermined condition to control the delay degree of a depth value on the basis of a detection result of the trigger, thereby making it possible to provide the user with more comfortable viewing and to further reduce the sense of discomfort given to the user.

3. Modification Examples

The description has been given above of the embodiments of the present disclosure. Hereinafter, description is given of some modification examples according to the present disclosure. It is to be noted that modification examples described below may be applied to the embodiments alone or in combination. In addition, the modification examples may be applied in place of or in addition to the configurations described in the foregoing embodiments.

3-1. Modification Example 1

In the foregoing embodiments, the descriptions have been given above of the examples, in each of which the display system is configured by two apparatuses, i.e., the HMD and the image processor. However, the present technology is not limited to such examples. For example, the HMD and the image processor may be an integrated apparatus. Alternatively, there may be another apparatus that provides content data. In particular, in a case where the content data includes mesh polygon data and texture data, the display system desirably includes another apparatus that provides content data in terms of data volume. Hereinafter, description is given, as Modification Example 1, of an example in which the display system includes another apparatus that provides content data, in addition to the HMD and the image processor.

FIG. 10 is a block diagram illustrating an example of a configuration of a display system 3000 according to Modification Example 1. As illustrated in FIG. 10, the display system 3000 according to the present embodiment includes the HMD 1, an image processor 2-3, a server 4, and a communication network 5. The image processor 2-3 and the server 4 are coupled to each other by the communication network 5, and are able to communicate information to each other.

It is to be noted that, among the configurations illustrated in FIG. 10, substantially the same configurations as the configurations described with reference to FIG. 2 are denoted by the same reference numerals.

As illustrated in FIG. 19, the image processor 2-3 includes a communication unit 23, a control unit 24-3, and a storage unit 27.

In addition to the functions of the communication unit 22 described with reference to FIG. 2, the communication unit 23 has a function of communicating with the server 4 via the communication network 5. For example, the communication unit 23 transmits the information indicating the position of the head and the posture of the user received from the HMD 1 to the server 4, and receives mesh polygon data and texture data from the server 4.

The control unit 24-3 differs from the control unit 24-1 illustrated in FIG. 2 in that the functions of a communication control section 242 and an input image generation section 244 differ partially from the functions of the communication control section 241 and the input image generation section 243 described with reference to FIG. 2.

The communication control section 242 differs from the communication control section 241 in that the communication control section 242 controls the communication unit 23 to transmit to the server 4 the information indicating the position of the head and the posture of the user and to receive from the server 4 the mesh polygon data and the texture data.

The input image generation section 244 differs from the input image generation section 243 in that the input image generation section 244 uses the mesh polygon data and the texture data received by the communication unit 23 from the server 4 to generate an input image and depth information corresponding to the input image.

The storage unit 27 differs from the storage unit 26 described with reference to FIG. 2 in that the storage unit 27 does not need to store content data in advance.

As illustrated in FIG. 10, the server 4 is an information processor including a communication unit 42, a control unit 44, and a storage unit 46.

The communication unit 42 is a communication module for transmitting and receiving data to and from another apparatus by wire or wirelessly. The communication unit 16 performs wireless communication with an external apparatus directly or via a network access point, for example, in a method such as wired LAN (Local Area Network), wireless LAN, Wi-Fi (Wireless Fidelity, registered trademark), infrared communication, Bluetooth (registered trademark), or short-range/non-contact communication.

For example, the communication unit 42 communicates with the image processor 2-3 via the communication network 5 to receive the information indicating the position of the head and the posture of the user from the image processor 2-3 and to transmit the mesh polygon data and the texture data to the image processor 2-3.

The control unit 44 functions as an arithmetic processing device and a control device, and controls overall operations inside the server 4 in accordance with various programs. In addition, the control unit 44 selects a texture corresponding to a viewpoint depending on the position of the head and the posture of the user from among a plurality of textures stored in storage unit 46, and causes the communication unit 42 to transmit the selected texture to the image processor 2-3.

The storage unit 46 stores content data including the mesh polygon data and data of the plurality of textures.

The description has been given above of Modification Example 1. According to Modification Example 1, for example, even in a case where a storage capacity of the storage unit 27 included in the image processor 2-3 is small or a case where processing performance is low, appropriate texture data is received from the server 4, thus enabling smooth display.

3-2. Modification Example 2

The description has been given, in the foregoing embodiments, of the example in which the sensor unit 12 of the HMD 1 includes the line-of-sight sensor and the visible pixel information is acquired by sensing; however, the present technology is not limited to such an example. For example, even in a case where the HMD 1 does not include the line-of-sight sensor, it is possible to specify a visible pixel. Such an example is described as Modification Example 2.

For example, the visible pixel information may be specified on the basis of information indicating a dominant eye of the user. For example, it is possible to specify, as the visible pixel, a position in the input image corresponding to the front position of the dominant eye of the user. It is to be noted that, as used herein, the dominant eye is an eye on side that is better used by a user, or is an eye on side that is more preferably used by the user. The information indicating the dominant eye may be provided in advance or may be inputted by the user. The specifying of the visible pixel based on the information indicating the dominant eye may be performed by the HMD or by the image processor.

FIG. 11 is an explanatory diagram of an example in which a visible pixel is specified using the information indicating the dominant eye. FIG. 11 illustrates a left eye display 14L and a right eye display 14R included in the display unit 14 of the HMD 1. In a case where the dominant eye of the user is a left eye $E_L$, the visible pixel is specified as a point $G_L$ in the left eye display 14L. In a case where the dominant eye of the user is a right eye $E_R$, the visible pixel is specified as a point $G_R$ in the right eye display 14R. It is to be noted that, association between a position in each display and an input image is achievable by well-known techniques, and thus description thereof is omitted here.

The description has been given above of Modification Example 2. According to Modification Example 2, even in a case where the HMD 1 does not include the line-of-sight sensor, it is possible to specify the visible pixel.

3-3. Modification Example 3

In the foregoing embodiments, the HMD is used as display apparatus, the present technology is not limited to such an example; it is possible to apply the present technology to the image display on a variety of display apparatuses. For example, applying the present technology to a display apparatus including a display unit that covers most of a field of view of the user, such as a dome-like display, also makes it possible for the user to obtain a higher sense of immersion, and is considered to be effective.

4. Hardware Configuration Example

The description has been given above of the embodiments of the present disclosure. Finally, description is given of a hardware configuration of an information processor according to the embodiments of the present disclosure with reference to FIG. 12. FIG. 12 is a block diagram illustrating an example of a hardware configuration of the information processor according to embodiments of the present disclosure. It is to be noted that an information processor 900 illustrated in FIG. 12 may implement, for example, the HMD 1, the image processors 2-1 to 2-3, and the server 4 illustrated in FIGS. 2, 8, and 10, respectively. Information processing performed by the HMD 1, the image processors 2-1 to 2-3, and the server 4 according to the embodiments of the present disclosure is achieved by cooperation of software together with hardware described below.

As illustrated in FIG. 12, the information processor 900 includes a CPU (Central Processing Unit) 901, a ROM (Read Only Memory) 902, a RAM (Random Access Memory) 903, and a host bus 904a. In addition, the information processor 900 includes a bridge 904, an external bus 904b, an interface 905, an input device 906, an output device 907, a storage device 908, a drive 909, a coupling port 911, a communication device 913, and a sensor 915. The information processor 900 may include a processing circuit such as a DSP or an ASIC in place of or in addition to the CPU 901.

The CPU 901 functions as an arithmetic processing device and a control device, and controls overall operations inside the information processor 900 in accordance with various programs. In addition, the CPU 901 may be a microprocessor. The ROM 902 stores a program to be used by the CPU 901, arithmetic parameters, and the like. The RAM 903 temporarily stores a program to be used in execution by the CPU 901 and parameters that change appropriately in the execution. The CPU 901 may form, for example, the control units 24-1 to 24-3 and the control unit 44.

The CPU 901, the ROM 902 and the RAM 903 are coupled to one another by the host bus 904a including a CPU bus. The host bus 904a is coupled to the external bus 904b such as a PCI (Peripheral Component Interconnect/Interface) bus via the bridge 904. It is to be noted that the host bus 904a, the bridge 904 and the external bus 904b may not necessarily be configured to be separated, but these functions may be implemented in one bus.

The input device 906 is implemented by a device with which information is inputted by a user, such as a mouse, a keyboard, a touch panel, a button, a microphone, a switch, and a lever. In addition, the input device 906 may be, for example, a remote control device using infrared rays or another radio wave, or may be an external coupling apparatus such as a mobile phone or a PDA corresponding to operations of the information processor 900. Further, the input device 906 may include, for example, an input control circuit that generates an input signal on the basis of information inputted by a user using the above-mentioned input means and outputs the generated input signals to the CPU 901. The user of the information processor 900 is able to input various types of data or instruct processing operations to the information processor 900 by operating this input device 906.

The output device 907 is formed by a device that is able to visually or audibly notify the user of acquired information. Examples of such a device include display devices such as a CRT display device, a liquid crystal display device, a plasma display device, an EL display device and lamp, sound output devices such as speaker and a headphone, and a printer device. The output device 907 outputs, for example, results obtained by various types of processing performed by the information processor 900. Specifically, the display device visually displays the results obtained by the various types of processing performed by the information processor 900 in a variety of formats, such as a text, an image, a table, and a graph. Meanwhile, the sound output device converts an audio signal, including reproduced sound data or acoustic data, into an analog signal and outputs the converted analog signal audibly. The output device 907 may form the display unit 14, for example.

The storage device 908 is a device for storing data formed as an example of the storage unit of the information processor 900. The storage device 908 is implemented by, for example, a magnetic storage unit device such as an HDD, a semiconductor storage device, an optical storage device, a magneto-optical storage device, or the like. The storage device 908 may include a storage medium, a recording device that records data in the storage medium, a reading device that reads the data from the storage medium, a deleting device that deletes the data recorded in the storage medium, and the like. The storage device 908 stores programs to be executed by the CPU 901, various data, various data acquired from the outside, and the like. The above storage device 908 may form, for example, the storage unit 26, the storage unit 27, and the storage unit 46.

The drive 909 is a reader/writer for a storage medium, and is built in or externally attached to the information processor 900. The drive 909 reads information recorded in an attached removable storage medium such as a magnetic disk, an optical disk, a magneto-optical disk, or a semiconductor memory, and outputs the read information to the RAM 903. In addition, the drive 909 is also able to write information into the removable storage medium.

The coupling port 911 is an interface to be coupled to an external apparatus, and is a coupling port with an external apparatus that is able to transmit data by a USB (Universal Serial Bus), for example.

The communication device 913 is, for example, a communication interface formed by a communication device, etc. for coupling to a network 920. The communication device 913 is, for example, a communication card, etc. for wired or wireless LAN (Local Area Network), LTE (Long Term Evolution), Bluetooth (registered trademark), or WUSB (Wireless USB). In addition, the communication device 913 may be a router for optical communication, a router for ADSL (Asymmetric Digital Subscriber Line), a modem for various types of communication, or the like. The communication device 913 is able to transmit and receive signals or the like to and from the Internet or other communication apparatuses in accordance with a predetermined protocol such as TCP/IP, for example. The communication device 913 may form, for example, the communication unit 22, the communication unit 23, and the communication unit 42.

The sensor 915 may be, for example, various sensors such as an acceleration sensor, a gyro sensor, a geomagnetic sensor, an optical sensor, a sound sensor, a ranging sensor, and a force sensor. The sensor 915 acquires information regarding a state of the information processor 900 itself, such as a posture and a moving speed of the information processor 900, and information regarding a surrounding environment of the information processor 900, such as brightness and noise around the information processor 900. In addition, the sensor 915 may include a GPS sensor that receives a GPS signal and measures the latitude, longitude, and altitude of the apparatus. The sensor 915 may form, for example, the sensor unit 12.

It is to be noted that the network 920 is a wired or wireless transmission path for information transmitted from an apparatus coupled to the network 920. For example, the network 920 may include a public network such as the Internet, a telephone network, a satellite communication network, and various types of LAN (Local Area Network) including Ethernet (registered trademark), WAN (Wide Area Network), and the like. In addition, the network 920 may include a private network such as IP-VPN (Internet Protocol-Virtual Private Network).

The description has been given above of an example of the hardware configuration that makes it possible to implement the functions of the information processor 900 according to an embodiment of the present disclosure. Each of the above-described components may be implemented using general-purpose members, or may be implemented by hardware specialized in the functions of the respective components. Accordingly, it is possible to appropriately change hardware configurations to be utilized in accordance with a technical level at the time of implementing the embodiments of the present disclosure.

It is to be noted that it is possible to create a computer program for implementing each function of the information processor 900 according to an embodiment of the present disclosure as described above and to mount the computer program on a PC, etc. In addition, it is also possible to provide a computer-readable recording medium in which such a computer program is stored. The recording medium is, for example, a magnetic disk, an optical disk, a magneto-optical disk, a flash memory, or the like. In addition, the computer program described above may be distributed via a network, for example, without using a recording medium.

5. Closing

As described above, according to the embodiments of the present disclosure, it is possible to further enhance a sense of immersion as if in a different space.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

For example, the steps in the foregoing embodiments need not necessarily be processed in time series in the order described as the flowchart diagram. For example, the steps in the processing of the foregoing embodiments may be processed in an order different from the order described as the flowchart diagram or may be processed in parallel.

In addition, the effects described herein are merely illustrative or exemplary, and are not limitative. That is, the technology according to the present disclosure may achieve, in addition to or in place of the above effects, other effects that are obvious to those skilled in the art from the description of the present specification.

It is to be noted that the technical scope of the present disclosure also includes the following configurations.

(1)

An image processor including:

an acquisition section that acquires visible pixel information regarding a pixel viewed by a user in an image; and an image processing section that performs blur processing on the image on a basis of depth information indicating a depth value corresponding to each of pixels of the image, the image processing section performing the blur processing on a basis of the visible pixel information and the depth information during a predetermined period after the visible pixel information is acquired.

(2)

The image processor according to (1), in which the image processing section performs the blur processing on a basis of a delay depth value and the depth information, the delay depth value being a delayed depth value corresponding to the pixel viewed by the user.

(3)

The image processor according to (2), in which the image processing section performs the blur processing on each of the pixels in accordance with a difference between the delay depth value and the depth value corresponding to each of the pixels.

(4)

The image processor according to (3), in which, in a case where there is a large difference between the delay depth value and a depth value corresponding to a pixel, the image processing section performs the blur processing on the pixel with stronger intensity, as compared with a case where there is a small difference between the delay depth value and the depth value corresponding to the pixel.

(5)

The image processor according to (3) or (4), in which the image processing section performs the blur processing by applying a blurring filter to each of the pixels, and sets a tap length of the blurring filter in accordance with the difference between the delay depth value and the depth value corresponding to each of the pixels.

(6)

The image processor according to any one of (2) to (5), in which the image processor further includes
a detection section that detects a trigger on a basis of a predetermined condition, and
a delay control section that delays the depth value corresponding to the pixel viewed by the user and outputs the delay depth value, and the delay control section controls a delay degree of the depth value on a basis of a result of the detection of the trigger performed by the detection section.

(7)

The image processor according to (6), in which the detection section detects a trigger related to a state of the user.

(8)

The image processor according to (7), in which the detection section detects a trigger related to a speed of a movement of the user.

(9)

The image processor according to any one of (6) to (8), in which the detection section detects a trigger related to an object included in the image.

(10)

The image processor according to (9), in which the detection section detects a trigger related to a distance between the user and the object.

(11)

The image processor according to any one of (6) to (10), in which the detection section detects a trigger related to a content type of the image.

(12)

The image processor according to any one of (1) to (11), further including a depth value acquisition section that acquires a depth value corresponding to the pixel viewed by the user in the image on a basis of the visible pixel information and the depth information.

(13)

The image processor according to any one of (1) to (12), in which the pixel viewed by the user in the image is specified on a basis of information indicating a dominant eye of the user.

(14)

The image processor according to any one of (1) to (13), in which the image is rendered from a viewpoint depending on a position or a posture of the user.

(15)

The image processor according to any one of (1) to (14), in which, in a case where the user views an image while moving, the predetermined period is decreased as compared with a case where the user views an image while stopping.

(16)

An image processing method including:

acquiring visible pixel information regarding a pixel viewed by a user in an image; and causing a processor to perform blur processing on the image on a basis of depth information indicating a depth value corresponding to each of pixels of the image, the blur processing being performed on the pixel viewed by the user in the image on a basis of the visible pixel information and the depth information during a predetermined period after the visible pixel information is acquired.

(17)

A program that causes a computer to function as an image processor, the image processor including an acquisition section that acquires visible pixel information regarding a pixel viewed by a user in an image, and an image processing section that performs blur processing on the image on a basis of depth information indicating a depth value corresponding to each of pixels of the image, the image processing section performing the blur processing on a basis of the visible pixel information and the depth information during a predetermined period after the visible pixel information is acquired.

REFERENCE NUMERALS LIST

1 HMD
2-1 image processor
4 server
5 communication network
24-1 control unit
26 storage unit
243 input image generation section
245 depth value acquisition section
246 detection section
247 delay control section
249 image processing section

The invention claimed is:

1. An image processor, comprising:
   an acquisition section configured to acquire visible pixel information regarding a pixel viewed by a user in an image; and
   an image processing section configured to execute a blur process on the pixel viewed by the user in the image, wherein
       the execution of the blur process is based on depth information indicating a depth value corresponding to each pixel of a plurality of pixels of the image,
       the execution of the blur process on the pixel is further based on a difference between a delay depth value and the depth value,
       the blur process is executed during a determined period after the visible pixel information is acquired, and
       the delay depth value is a delayed depth value corresponding to the pixel viewed by the user.

2. The image processor according to claim 1, wherein, in a case where the difference between the delay depth value and the depth value corresponding to the pixel is large, the image processing section is further configured to execute the blur process on the pixel with a stronger intensity.

3. The image processor according to claim 1, wherein the image processing section is further configured to:
   execute the blur process by application of a blurring filter to the pixel; and
   set a tap length of the blurring filter in accordance with the difference between the delay depth value and the depth value.

4. The image processor according to claim 1, further comprising:
   a detection section configured to detect a trigger based on a basis of a determined condition; and
   a delay control section configured to:
       delay the depth value corresponding to the pixel viewed by the user and output the delay depth value; and
       control a delay degree of the depth value based on a result of the detection of the trigger by the detection section.

5. The image processor according to claim 4, wherein the detection section is further configured to detect the trigger related to a state of the user.

6. The image processor according to claim 5, wherein the detection section is further configured to detect the trigger related to a speed of a movement of the user.

7. The image processor according to claim 4, wherein the detection section is further configured to detect the trigger related to an object included in the image.

8. The image processor according to claim 7, wherein the detection section is further configured to detect the trigger related to a distance between the user and the object.

9. The image processor according to claim 4, wherein the detection section is further configured to detect the trigger related to a content type of the image.

10. The image processor according to claim 1, further comprising a depth value acquisition section configured to acquire the depth value corresponding to the pixel in the image based on a basis of the visible pixel information and the depth information.

11. The image processor according to claim 1, wherein the image processor is configured to specify the pixel viewed by the user in the image is specified based on information indicating a dominant eye of the user.

12. The image processor according to claim 1, wherein the image processor is configured to control display of the image from a viewpoint based on one of a position of the user or a posture of the user.

13. The image processor according to claim 1, wherein, in a case where the user that views the image is in motion, the image processor is configured to decrease the determined period as compared with a case where the user that views the image is stationary.

14. An image processing method, comprising:
acquiring visible pixel information regarding a pixel viewed by a user in an image; and
executing a blur process on the pixel viewed by the user in the image, wherein
the execution of the blur process is based on depth information indicating a depth value corresponding to each pixel of a plurality of pixels of the image,
the execution of the blur process on the pixel is further based on a difference between a delay depth value and the depth value,
the blur process is executed during a determined period after the visible pixel information is acquired, and
the delay depth value is a delayed depth value corresponding to the pixel viewed by the user.

15. A non-transitory computer-readable medium having stored thereon, computer-executable instructions which, when executed by a processor, cause the processor to execute operations, the operations comprising:
acquiring visible pixel information regarding a pixel viewed by a user in an image; and
executing a blur process on the pixel viewed by the user in the image, wherein
the execution of the blur process is based on depth information indicating a depth value corresponding to each pixel of a plurality of pixels of the image,
the execution of the blur process on the pixel is further based on a difference between a delay depth value and the depth value,
the blur process is executed during a determined period after the visible pixel information is acquired, and
the delay depth value is a delayed depth value corresponding to the pixel viewed by the user.

16. An image processor, comprising:
an acquisition section configured to acquire visible pixel information regarding a pixel viewed by a user in an image;
a detection section configured to detect a trigger based on a determined condition;
a delay control section configured to:
delay a depth value corresponding to the pixel viewed by the user and output a delay depth value; and
control a delay degree of the depth value based on a result of the detection of the trigger by the detection section; and
an image processing section configured to execute a blur process on the pixel viewed by the user in the image, wherein
the execution of the blur process is based on depth information indicating the depth value corresponding to each pixel of a plurality of pixels of the image,
the execution of the blur process on the pixel viewed by the user is further based on the delay depth value and the depth information,
the blur process is executed during a determined period after the visible pixel information is acquired, and
the delay depth value is a delayed depth value corresponding to the pixel viewed by the user.

* * * * *